March 29, 1949.    M. L. BENJAMIN    2,465,836
TAP CHUCK
Filed June 12, 1945
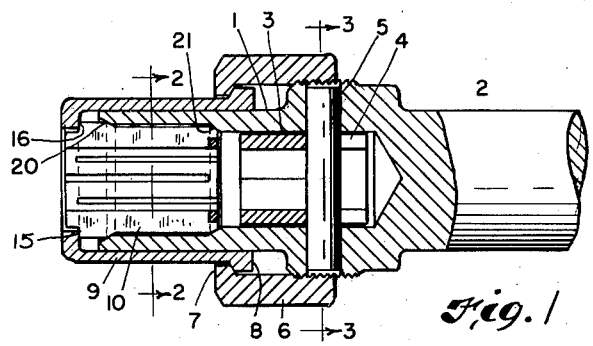
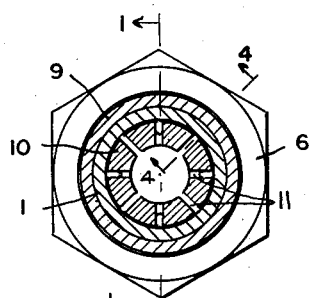
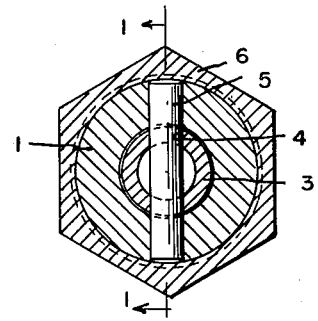
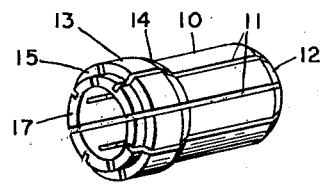
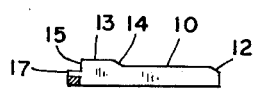
INVENTOR.
MILTON L. BENJAMIN
BY
Oberlin & Limbach
ATTORNEYS Patented Mar. 29, 1949

2,465,836

UNITED STATES PATENT OFFICE 2,465,836

TAP CHUCK

Milton L. Benjamin, Shaker Heights, Ohio

Application June 12, 1945, Serial No. 599,003

3 Claims. (Cl. 279—49)

1

The present invention, relating as indicated to chucks, has more particular regard to the provision of a chuck for holding a tap or like tool in which compactness as well as accurate alignment and positive drive is a requirement.

The present invention constitutes an improvement in the chuck that forms the subject matter of my prior Patent No. 2,228,685, dated January 14, 1941, such improvements relating to the form of the collet and cooperating shank or body, as well as to the nose-piece whereby the former is secured in the latter and caused to grip the tap or like tool which the chuck is designed to carry. One object of such improved collet construction is to permit the same to be made of relatively shorter length while still retaining capacity for uniform contraction which is a feature of such patented chuck. Another object is to provide an improved form of engagement between the nose-piece and the collet for effecting longitudinal movement of the latter whereby it may be thus contracted.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a central longitudinal section of a chuck embodying my present improvements;

Figs. 2 and 3 are transverse sections thereof respectively taken on the planes indicated by the lines 2—2 and 3—3 Fig. 1;

Fig. 4 is a longitudinal section of the collet by itself taken on a plane different from that of Fig. 1, as indicated by line 4—4 on Fig. 2; and Fig. 5 is a perspective view of the collet by itself.

Referring to the assembled view of the device afforded by Figs. 1, 2 and 3, the main element will be seen to comprise a hollow body 1 formed in one end of a shank 2, the other end of which is broken away but will be of form suitable for engagement with the usual driving means employed in a tapping operation. Received in the inner portion of body 1 is an interchangeable driver 3 that is adapted to be held against rotation by engagement between slots 4 formed in its inner end with a pin 5 that extends transversely through the adjacent portion of said body. The opposite end of the driver is formed with an opening of rectangular or other polygonal form to receive the inner end of the tap or other tool which is to be gripped by the chuck.

The portion of body 1 in which the driver is thus held is exteriorly threaded to receive a coupling 6, the forward end of which is formed with an inwardly directed flange 7 adapted to engage an outwardly directed flange 8 on a nose-piece 9 which serves, as will presently be described, to actuate the collet 10 that is reciprocably mounted within the forward portion of hollow body 1. Said coupling 6 and nose-piece 9 together constitute a coupling unit for actuating the collet 10, and said parts 6 and 9 may therefore, if desired, be integral with one another.

As best illustrated in Fig. 5, said collet comprises a sleeve formed with a series of slots 11 that extend longitudinally thereof alternately from opposite ends. The main body of the collet has a cylindrical exterior surface which terminates at its inner end in an inwardly bevelled or conical surface 12. Adjacent the outer end the collet is formed with a cylindrical surface 13 of relatively short longitudinal extent but of larger diameter than the body of the collet, and the two cylindrical surfaces are joined by a second inwardly bevelled or conical surface 14 that is parallel with conical surface 12, the apices of both such conical surfaces coinciding with the axis of the collet. At its outer edge the enlarged cylindrical portion 13 of the collet presents a shoulder 15 lying in a plane perpendicular to the axis of the collet. Such shoulder 15 is disposed to be engaged by an inwardly directed flange 16 on the outer end of nose-piece 9. However, it will be noted that the body of the collet extends in the form of a cylindrical projection 17 beyond such shoulder 15.

The longitudinal slots 11 which extend from the inner end of the collet are cut through the enlarged cylindrical portion 13 and terminate just short of severing this extension 17. The alternate slots which extend from the forward end of the collet similarly terminate just short of severing the bevelled inner end of the latter. Complementary to the bevelled or outwardly directed conical bearing surfaces 12 and 14 on the collet 10, the forward portion of hollow body 1 is formed with correspondingly spaced inwardly directed conical bearing surfaces which engage such faces on the collet, and upon the latter being pressed inwardly by action of nose-piece 9, cause said collet to contract and thus firmly grip the stem or shank of the tool which the chuck is designed to hold.

From the foregoing description it will be seen that an exceedingly compact structure is provided wherein the collet is maintained in accurate alignment with the axis of the holder both in open position and in gripping position. Due to the disposition of the complementary conical bearing surfaces on the collet and holder, the contraction of the latter as it is longitudinally pressed inwardly will be the same at both ends and due to the form and extent of the longitudinal slots such contraction of the collet may be effected with ease, i. e. no undue pressure requires to be exerted in tightening up the nose-piece. Due to the short and compact form of the device as a whole, it is, as indicated, particularly suited for use as a tap chuck.

Other modes of applying the principles of my invention may be employed instead of the one explained, change being made as regards the mechanism herein disclosed, provided the means stated by any of the following claims or the equivalent of such stated means be employed.

I therefore particularly point out and distinctly claim as my invention:

1. In a chuck, the combination of a shank in the form of a hollow body, a pin extending transversely through said body, a replaceable driver fitted over said pin and non-rotatably held in the inner portion of said body, a collet in the form of a contractible sleeve adapted to fit within said body adjacent said driver, said body having inwardly directed, conical bearing surfaces and said sleeve having complementary, outwardly directed conical bearing surfaces inclining in a direction away from the outer ends of said body and sleeve and having their apices coinciding with the common axis thereof, a nose-piece longitudinally adjustable upon said body and adapted to press against the outer end of said sleeve, and a coupling threaded upon said body and rotatably engaging said nose-piece for thus adjusting the latter, said coupling having an annular skirt portion thereon overlying the ends of said pin for retaining said pin against transverse displacement relative to said body.

2. In a chuck, the combination of a shank in the form of a hollow body, a pin extending transversely through said body, a driver in said body non-rotatably fitted over said pin, a collet in the form of a contractible sleeve adapted to fit within said body adjacent said driver, said body and sleeve being formed with interengaging complementary conical bearing surfaces so formed that movement of said sleeve into said body effects contraction of the former, and a coupling unit threaded upon said body engaging the outer end of said sleeve for so moving said sleeve into said body, said coupling unit having an annular skirt portion thereon overlying the ends of said pin for retaining said pin against transverse displacement relative to said body.

3. In a chuck, the combination of a shank in the form of a hollow body, a pin extending transversely through said body, a driver in said body non-rotatably fitted over said pin, a collet in the form of a contractible sleeve adapted to fit within said body adjacent said driver, said body and sleeve being formed with interengaging complementary conical bearing surfaces so formed that movement of said sleeve into said body effects contraction of the former, a nose-piece longitudinally adjustable upon said body and adapted to press against the outer end of said sleeve, and a coupling threaded upon said body and rotatably engaging said nose-piece for thus adjusting the latter, said coupling having an annular skirt portion thereon overlying the ends of said pin for retaining said pin against transverse displacement relative to said body.

MILTON L. BENJAMIN.

REFERENCES CITED

The following references are of record in the file of this patent:

UNITED STATES PATENTS

| Number | Name | Date |
| --- | --- | --- |
| 207,113 | Elterick et al. | Aug. 20, 1878 |
| 543,606 | Worsley | July 30, 1895 |
| 1,837,419 | Ertel | Dec. 22, 1931 |
| 1,899,843 | Bascom | Feb. 28, 1933 |
| 2,176,071 | Hall | Oct. 17, 1939 |
| 2,228,685 | Benjamin | Jan. 14, 1941 |
| 2,343,570 | Nelson | Mar. 7, 1944 |
| 2,358,299 | Benjamin et al. | Sept. 19, 1944 |
| 2,381,335 | Clare | Aug. 7, 1945 |